(12) United States Patent
Wong

(10) Patent No.: US 10,336,137 B2
(45) Date of Patent: Jul. 2, 2019

(54) ELECTRORHEOLOGICAL FLUIDS INCORPORATED INTO POLYMERIC ARTICLES AND TIRES

(71) Applicant: The University of Akron, Akron, OH (US)

(72) Inventor: Shing-Chung Wong, Copley, OH (US)

(73) Assignee: The University of Akron, Akron, OH (US)

(*) Notice: Subject to any disclaimer, the term of this patent is extended or adjusted under 35 U.S.C. 154(b) by 903 days.

(21) Appl. No.: 13/904,369

(22) Filed: May 29, 2013

(65) Prior Publication Data

US 2013/0319859 A1 Dec. 5, 2013

Related U.S. Application Data

(60) Provisional application No. 61/653,626, filed on May 31, 2012.

(51) Int. Cl.
| | | |
|---|---|---|
| *B60C 1/00* | (2006.01) | |
| *B01J 19/08* | (2006.01) | |
| *B60C 11/14* | (2006.01) | |
| *B60C 19/00* | (2006.01) | |

(52) U.S. Cl.
CPC ............ *B60C 1/00* (2013.01); *B01J 19/087* (2013.01); *B60C 11/14* (2013.01); *B60C 19/00* (2013.01)

(58) Field of Classification Search
CPC . B60C 1/00; B60C 19/00; B60C 11/14; B01J 19/087
USPC ......... 204/157.15, 450, 600; 152/532, 152.1, 152/209.5, 525, 537, 527, 547, 548, 564
See application file for complete search history.

(56) References Cited

U.S. PATENT DOCUMENTS

| | | | | | |
|---|---|---|---|---|---|
| 1,653,356 A | * | 12/1927 | Freeman | ................ | B29D 30/52 156/324 |
| 1,966,087 A | * | 7/1934 | Bostwick | ............... | B29D 30/30 156/361 |
| 3,013,599 A | * | 12/1961 | Riggs | ........................ | B60C 5/12 152/458 |
| 3,460,599 A | * | 8/1969 | Leach | .................... | B60C 15/06 152/458 |
| 4,923,057 A | * | 5/1990 | Carlson | ..................... | E04B 1/98 188/267.1 |
| 4,994,198 A | * | 2/1991 | Chung | .................... | C08L 83/04 252/572 |

(Continued)

FOREIGN PATENT DOCUMENTS

| | | | | | |
|---|---|---|---|---|---|
| GB | | 2375977 A | * | 12/2002 | ........ C10M 171/001 |
| KR | 20120015647 A | | * | 2/2012 | |

OTHER PUBLICATIONS

KR 20120015647 A machine translation and Derwent abstract.*

*Primary Examiner* — Nicholas A Smith
*Assistant Examiner* — Colleen M Raphael
(74) *Attorney, Agent, or Firm* — Renner Kenner Greive Bobak Taylor & Weber

(57) ABSTRACT

A polymeric article includes an electrorheological (ER) fluid in a polymer medium. In some applications, the polymer medium forms a body ply of a tire. The ER fluid can be incorporated into the polymeric article in a number of particular ways. The ER fluid may simply fill a pocket in the polymeric article or may be part of an electrorheological composite or electrorheological microsphere. The ER fluid is responsive to the application of an electric field to change the apparent viscosity or elastic modulus of the polymeric article.

6 Claims, 6 Drawing Sheets

(56) References Cited

U.S. PATENT DOCUMENTS

| | | | | |
|---|---|---|---|---|
| 5,561,173 | A * | 10/1996 | Dry | B29C 73/22 428/320.2 |
| 5,810,126 | A * | 9/1998 | Kordonsky | B32B 33/00 188/267 |
| 7,550,189 | B1 * | 6/2009 | McKnight | B32B 3/10 148/563 |
| 2001/0050032 | A1 * | 12/2001 | Dry | C04B 22/006 106/677 |
| 2004/0016486 | A1 * | 1/2004 | Tropper | B60C 11/00 152/151 |
| 2006/0255663 | A1 * | 11/2006 | Vlad | H02N 2/18 310/26 |
| 2007/0043306 | A1 * | 2/2007 | Olson | A61L 31/14 600/585 |
| 2007/0087198 | A1 * | 4/2007 | Dry | B29C 73/22 428/408 |
| 2007/0246143 | A1 * | 10/2007 | Durif | B60C 5/16 152/555 |
| 2010/0077848 | A1 * | 4/2010 | Ulicny | B29D 30/0061 73/146 |
| 2011/0024010 | A1 * | 2/2011 | Browne | B60C 11/00 152/209.5 |
| 2012/0114778 | A1 * | 5/2012 | Keefe | B29C 59/02 425/135 |
| 2012/0189795 | A1 * | 7/2012 | Wong | D01D 5/0069 428/36.91 |
| 2012/0202397 | A1 * | 8/2012 | Wolf | B82Y 30/00 442/111 |
| 2013/0046439 | A1 * | 2/2013 | Anderson | B60C 23/002 701/36 |
| 2013/0046446 | A1 * | 2/2013 | Anderson | B60T 8/1755 701/50 |

* cited by examiner

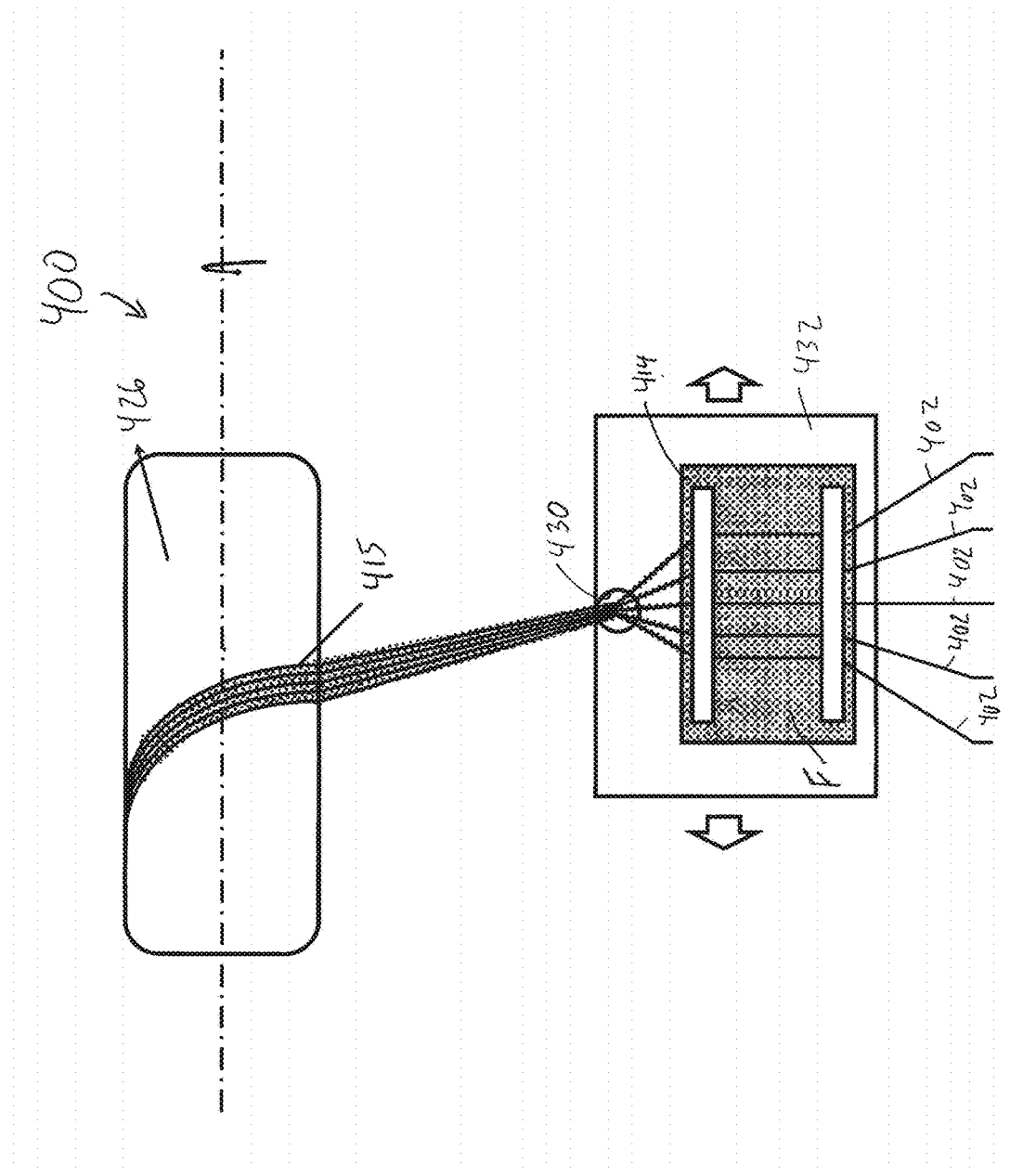

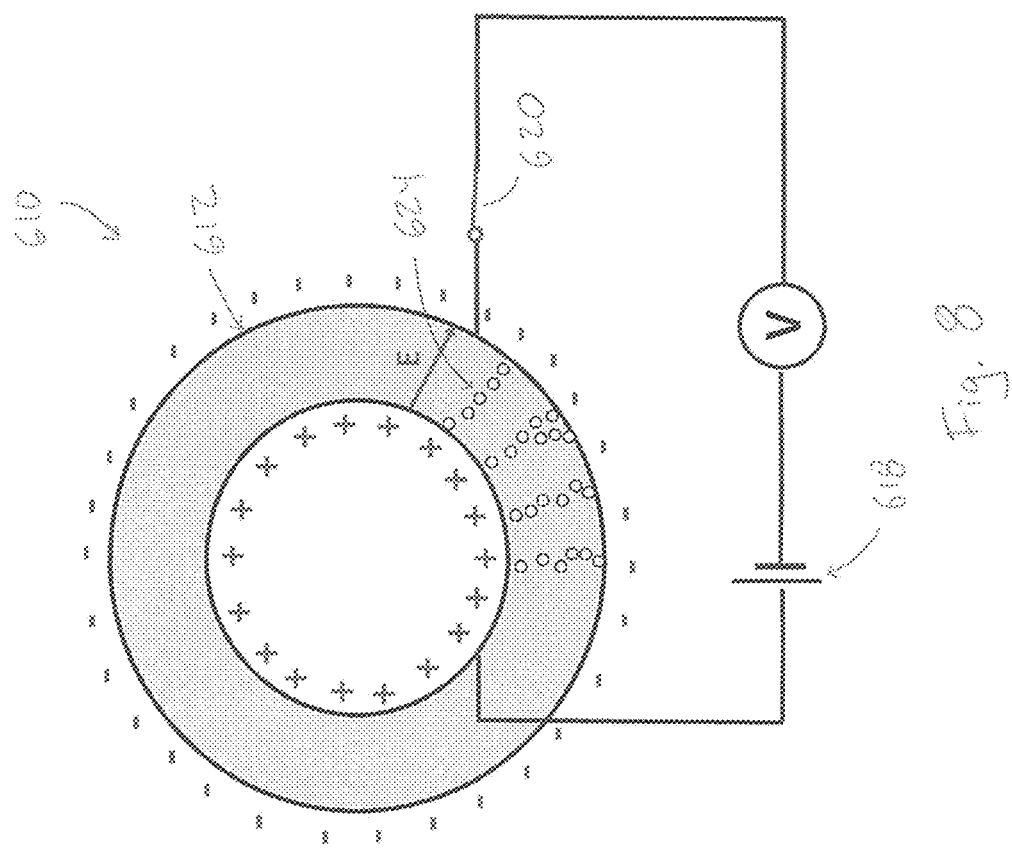

ELECTRORHEOLOGICAL FLUIDS INCORPORATED INTO POLYMERIC ARTICLES AND TIRES

CROSS-REFERENCE TO RELATED APPLICATION

This application claims priority from U.S. provisional patent application Ser. No. 61/653,626 filed on May 31, 2012, which is incorporated herein by reference in its entirety.

FIELD OF THE INVENTION

The present invention generally relates to rubber articles having electrorheological fluids incorporated therein. In particular embodiments, the electrorheological fluid is introduced to the rubber article through composite processing, wherein the electrorheological fluid is incorporated into woven or non-woven fabrics, fiber preforms or discreet chopped strands and discontinuous fibers on tows and prepregs. In particular embodiments, the rubber articles are tires, and the incorporation of electrorheological fluids therein allows the elastic modulus and thereby viscoelasticity and rolling resistance of the tire to be modified by the application of electric field across the electrorheological fluid-containing structures.

BACKGROUND OF THE INVENTION

It is generally appreciated that rubber articles have certain inherent properties such as viscoelasticity, which is not generally variable in the end article. That is, once the rubber article is made, its viscoelasticity is generally set and cannot be selectively varied. Understanding that certain rubber articles may benefit from the ability to vary the elastic modulus, whether time-dependent or time-independent, thereof, the present invention seeks to provide such rubber articles and methods for making them.

The present invention may find particular application in tires. Rolling resistance contributes to 6 to 10% of the overall fuel consumption in a vehicle. Its rolling resistance of tires could be reduced by even a small percentage, fuel consumption could be significantly lowered. However, merely providing tires with significantly lower or higher rolling resistance is not an acceptable solution in that the viscoelasticity quantified by loss tans as required for a great reduction in rolling resistance, for example, on a highway, would not be found suitable for driving conditions requiring higher torque, frictional force and traction in tires, such as driving mountainous roads and lifting heavy loads. Thus, there is a need in the art for rubber articles, and particularly tires, in which the elastic modulus and time-dependent elasticity thereof can be varied, at will.

SUMMARY OF THE INVENTION

A first embodiment of this invention provides a polymeric article comprising an electrorheological fluid in a polymer medium.

A second embodiment provides a polymeric article as in the first embodiment, wherein said polymer medium forms a body ply of a tire.

A third embodiment provides a polymeric article as in the first or second embodiment, wherein said electrorheological fluid at least partially fills a pocket formed in the polymer medium.

A fourth embodiment provides a polymeric article as in any of the first through third embodiments, wherein the electrorheological fluid is part of an electrically-responsive component, said electrically-responsive component selected from an electrorheological composite and electrorheological microsphere, said electrorheological composite including an electrorheological fluid having a viscosity that is responsive to the application of an electric field, said electrorheological microsphere including an electrorheological fluid having a viscosity that is responsive to the application of an electric field.

A fifth embodiment provides a polymeric article as in any of the first through fourth embodiments, wherein said electrically-responsive component is an electrorheological composite, said electrorheological composite including a support selected from fibers, fabrics, tows, performs and prepregs.

A sixth embodiment provides a polymeric article as in any of the first through fifth embodiments, wherein said electrorheological composite is a woven or non-woven fabric.

A seventh embodiment provides a polymeric article as in any of the first through sixth embodiments, wherein said support is formed at least in part from an electroactive component selected from electroactive polymers and electroactive ceramics.

An eighth embodiment provides a polymeric article as in any of the first through seventh embodiments, wherein said electroactive component is piezoelectric.

A ninth embodiment provides a polymeric article as in any of the first through eighth embodiments, wherein said electroactive component is an electroactive ceramic selected from lead zirconate titanate (PZT), barium titanate (BT), strontium titanate (ST) and quartz.

A tenth embodiment provides a polymeric article as in any of the first through ninth embodiments, wherein said electrorheological fluid is selected from barium titanyl oxalate particles suspended in silicone oil.

A eleventh embodiment provides a polymeric article as in any of the first through tenth embodiments, further comprising a voltage source selectively applying voltage to said electrorheological fluid.

A twelfth embodiment provides a polymeric article as in any of the first through eleventh embodiments, further comprising a voltage source selectively applying voltage to said electrorheological fluid.

A thirteenth embodiment of this invention provides a method of altering the elastic modulus of a polymeric article comprising providing the polymeric article as comprising an electrorheological fluid in a polymeric medium; and subjecting the electrorheological fluid to an electric field thereby changing the elastic modulus of the electrorheological fluid and the overall elastic modulus of the polymeric article.

A fourteenth embodiment provides a method as in the thirteenth embodiment, wherein said polymer medium forms a body ply of a tire.

A fifteenth embodiment provides, a method as in the thirteenth or fourteenth embodiments, wherein said electrorheological fluid at least partially fills a pocket formed in the polymer medium.

A sixteenth embodiment provides a polymeric article as in any of the thirteenth through fifteenth embodiments, wherein the electrorheological fluid is part of an electrically-responsive component, said electrically-responsive component selected from an electrorheological composite and electrorheological microsphere, said electrorheological composite including an electrorheological fluid having a viscosity that is responsive to the application of an electric field, said electrorheological microsphere including an electrorheological fluid having a viscosity that is responsive to the application of an electric field.

A seventeenth embodiment provides a polymeric article as in any of the thirteenth through sixteenth embodiments, wherein said electrically-responsive component is an electrorheological composite, said electrorheological composite including a support selected from fibers, fabrics, tows, performs and prepregs.

An eighteenth embodiment provides a polymeric article as in any of the thirteenth through seventeenth embodiments, wherein said electrorheological composite is a woven or non-woven fabric.

A nineteenth embodiment provides a polymeric article as in any of the thirteenth through eighteenth embodiments, wherein said support is formed at least in part from an electroactive component selected from electroactive polymers and electroactive ceramics.

A twentieth embodiment provides a polymeric article as in any of the thirteenth through nineteenth embodiments, wherein said electroactive component is piezoelectric.

BRIEF DESCRIPTION OF THE DRAWINGS

FIG. 6 is a general schematic of an exemplary method of creating electrorheological fluid bearing tows for use in this invention;

FIG. 7 is a general schematic of an exemplary method of creating a polymeric article in accordance with this invention employing discreet (chopped) fibers to be immersed in electrorheological fluid;

FIG. 8 is a general schematic representation of a piezoelectric material tube filled with electrorheological fluid and showing the response thereof to applied stress; and FIG. 9 is a general schematic representation of the application of this invention in a tire.

DETAILED DESCRIPTION OF ILLUSTRATIVE EMBODIMENTS

The present invention incorporates electrorheological fluids (ER fluids) into polymeric articles. The present invention introduces the ER fluids to the polymeric article in many different ways as any of them might be found preferably for a given purposed. In some embodiments, the ER fluid either partially or fully fills a pocket formed in the polymeric article. In other embodiments, the ER fluid is part of a composite fabrication incorporated into the polymeric article, and in yet other embodiments, the ER fluid fills microspheres that are incorporated into the polymeric material. These microspheres are herein referred to as "electrorheological microspheres" The composite fabrication may take many forms, including fibers, fabrics, tows, fiber performs and fiber prepregs that are introduced into an ER fluid bath so as to be fully soaked with stable electrorheological suspensions. These composites are herein referred to "electrorheological composites." The electrorheological composites and electrorheological microspheres are collectively understood as "electrically-responsive components."

In some embodiments, the fibers are hollow and thus the ER fluid can fill the fibers and can therefore be applied to either the inside or outside of fibers or both. In some embodiments, the fibers are formed into woven or non-woven fabrics with the ER fluid incorporated therein, thereon or both. In microsphere embodiments, the microspheres will have ER fluids in their internal volume. The woven or non-woven fabric or fibers/microspheres are incorporated into polymeric articles such that the application of electric field across the ER fluid results in an increase in viscoelasticity represented by storage modulus or loss tans of the polymeric article. In the application of vehicle tires, the application of electric field could be employed to selectively increase the elastic modulus of the tires when decreased rolling resistance is desired, as, for example, when travelling at higher speeds on smoother surfaces such as highways. When improved tire responsiveness is desired, the electric field could be removed to decrease the elastic modulus of the tires, to provide great traction and vehicle stability.

Figure 1:
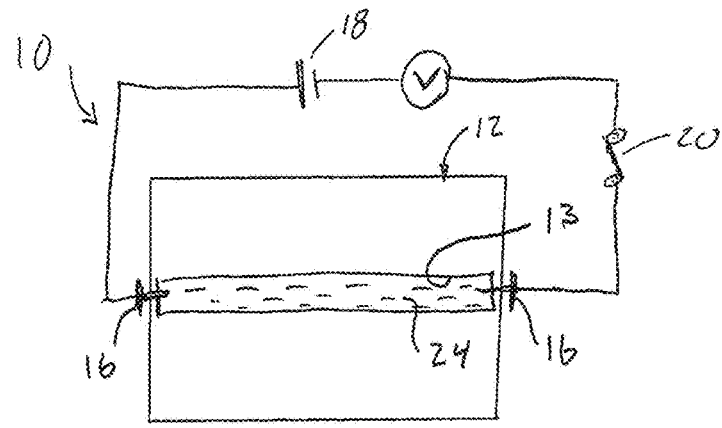
FIG. 1 is a general schematic representation of a polymeric article in accordance with this invention employing electrorheological fluid in a pocket within the polymeric article.

Referring now to FIG. 1, a first embodiment of a polymeric article in accordance with this invention is shown and designated by the numeral 10. Polymeric article 10 includes a polymer medium 12 having an ER fluid 24 filling a pocket 13 therein. The ER fluid 24 is present so that, upon the application of an electric voltage through terminals 16 and a voltage source 18, the particles suspended within the ER fluid 24 become ordered and aligned in direction of electric field lines and this ordering results in an increase the overall elastic modulus of the polymeric article 10. It is noted that other theories exist (such as the water bridge theory), and this invention is not limited to or by any particular theory of how or why ERFs behave as they do. A switch 20 is represented as well, along with a voltmeter V.

Figure 2:
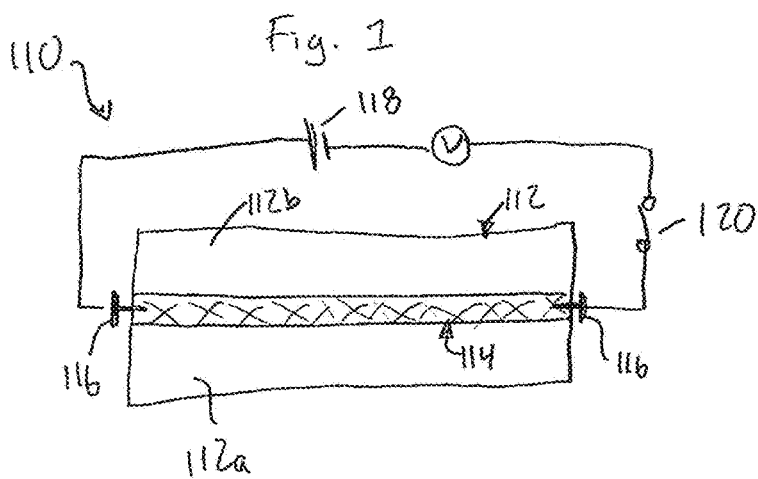
FIG. 2 is a general schematic representation of a polymeric article in accordance with this invention employing an electrorheological composite.

Referring now to FIG. 2, a first embodiment of a polymeric article in accordance with this invention is shown and designated by the numeral 110. Polymeric article 110 includes a polymer medium 112 having an electrorheological composite 114 embedded therein. In some embodiments, the electrorheological composite 114 forms a mid-layer between a first layer of polymer material 112a and a second layer of polymer material 112b. In other embodiments, the electrorheological composite 114 may be completely surrounded by the polymer medium 112. The electrorheological composite 114 is present so that, upon the application of an electric voltage through terminals 116 and a voltage source 118, the electrorheological composite 114 stiffens to increase the overall elastic modulus of the polymeric article 110. A switch 120 is represented as well, along with a voltmeter V.

The electrorheological composite 114 is a composite material that, in the embodiment of FIG. 2 includes one or more of fibers, fabrics (woven or non-woven), tows, fiber performs and fiber prepregs that are either impregnated or surrounded or filled or any combination thereof with ER fluid. In some embodiments, the electrorheological composite 114 comprises a woven or non-woven fabric having an ER fluid that surrounds and penetrates the surfaces and weave (in the case of a woven fabric) or interstices (in the case of overlapping portions of a non-woven fabric). In other embodiments, the electrorheological composite 114 is a mat of discrete fibers surrounded with ER fluid so as to create a similar end result as the woven or non-woven fabrics just mentioned. Any established composite forming process such as the well-known filament winding, pultrusion, chopped strand mats and roving can be combined with ER fluid inclusion.

Figure 3:
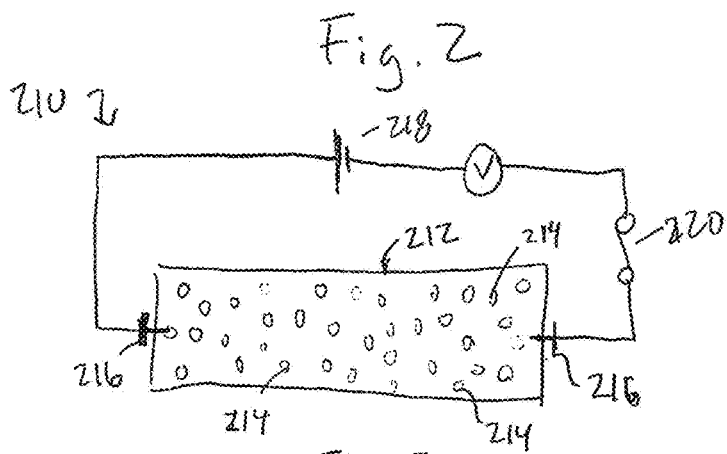
FIG. 3 is a general schematic representation of a polymeric article in accordance with this invention employing electrorheological fluid-filled microspheres.
Figure 4:
FIG. 4 is a general schematic of an electrorheological fluid-filled microsphere.

Another embodiment of a polymeric article in accordance with this invention is shown in FIG. 3 and designated by the numeral 210. In this embodiment, a polymer matrix 212 surrounds electrorheological microspheres 214. As seen in a representative cross section in FIG. 4, the electrorheological microsphere 214 includes a microsphere 222 containing an ER fluid 224 therein. The elastic modulus of polymeric article 210 may be varied by the application of an electric voltage across terminals 216 and power source 218. As with the prior embodiment, a switch 220 is represented, along with a voltmeter V.

It should be appreciated that these drawings are employed merely to describe the general concept of the invention. The polymers, fabrics, fibers, tows, mats, preforms, prepregs, microspheres, ER fluids, terminals and voltage sources can all be selected according to a particular application.

The polymer matrix may be selected from virtually any polymer material. In some embodiments, the polymer matrix is a tire rubber and the rubber article is the body ply of a tire, consisting of one layer of rubber, one layer of electrorheological composite, and a second layer of rubber.

The woven or non-woven fabric may be selected from virtually any woven or non-woven fabric. In some embodiments, the fabric is a woven fabric chosen from a plain weave, satin weave and twill weave fabric. In other embodiments, the fabric is a non-woven fabric selected from electrospun fabrics, and fabrics formed of fibers by the gas jet, melt-spinning and wet spinnng methods.

In these embodiments involving fabrics and ER fluids, the fabric may simply be passed through an ER fluid bath to retain electrorheological suspensions thereon as well as within the interstices of the woven or non-woven fibers.

In a particular embodiment, the fabric is the reinforcing fabric of a body ply of a tire. In such embodiments, the reinforcing fabric is selected from common tire reinforcing fabric materials such as carbon, aramid, graphite, cotton, rayon, nylon, polyester and para-aramid fibers (e.g., Kevlar™). In other embodiments, the composite is made of discrete fibers sprayed or otherwise formed into a layer on a polymer substrate and then encapsulated by the layering of an additional polymer substrate thereon. These chopped fibers are mixed with ER fluid such that the sprayed mat of discrete fibers also carries ER fluid on the fibers and within the interstices formed in the mat of fibers. Such fibers may be formed from the aforementioned materials.

In some embodiments, the fibers employed to create the discrete fibers or the woven or non-woven fabrics are hollow and are filled with electrorheological suspensions. This may be achieved, for example, by the methods as disclosed in US Published Patent Application US 2012/0189795. Methods therein focus particularly upon the creation of electroactive polymers, but, for purposes of the present invention, similar methods may be practiced with virtually any polymer capable of being electrospun in order to create the desired the ER fluid-filled fiber.

As just touched upon, in some embodiments, the electrorheological composite may include fibers, fabrics, tows, performs or prepregs formed of electroactive materials such as electroactive polymers and electroactive ceramics.

An electroactive polymer will exhibit a change in size when stimulated by an electrical field. Some electroactive polymers, known as piezoelectric polymers, also conversely generate an electrical field (or electric polarization) when mechanical stress (e.g., pressure) is applied to the polymers. In the present invention, the generation of an electrical field upon applied pressure can be a particularly desirable property, but electroactive polymers that do not exhibit the piezoelectric effect are also useful. The benefits relating to the piezoelectric properties of some polymers will be described more fully below. Suitable piezoelectric polymer may broadly be selected from any polymer exhibiting this property, whether currently existing or hereinafter discovered. It is noted that piezoelectric polymers are the focus of much research in present times such that other specific types of piezoelectric polymer will likely be developed. The processing thereof in accordance with this invention to create the structures herein will be within the level of ordinary skill in the art.

Suitable piezolelectric polymers will include four critical elements that exist for all piezoelectric polymers, regardless of morphology. These essential elements are: (a) the presence of permanent molecular dipoles; (b) the ability to orient or align the molecular dipoles; (c) the ability to sustain this dipole alignment once it is achieved; and (d) the ability of the material to undergo large strains when mechanically stressed. This is known in the art such that suitable piezoelectric materials can be chosen by those of ordinary skill in the art.

Suitable electroactive polymers may be selected from ferroelectric polymers, dielectric elastomers, electrostrictive graft polymers, liquid crystalline polymers, ionic polymer-metal composites and piezoelectric polymers. The electroactive polymer may also be provided by polymers carrying magnetite and/or ferroelectric nanoparticles. It will be appreciated that some materials fall into more than one of these groups. By way of example, and without being limited hereto, suitable electroactive polymers include polyvinylidene fluoride (PVDF), trifluoroethylene (TrFE), PVDF and TrFE copolymers, PVDF and tetraflouoroethylene copolymers and odd-numbered nylon.

Electroactive ceramics showing a piezoelectric effect are also suitable for embodiments of this invention. Suitable examples include lead zirconate titanate (PZT), barium titanate (BT), strontium titanate (ST), quartz, and others.

ER fluids are suspensions of extremely fine non-conducting particles (up to 50 micrometres diameter) in an electrically insulating fluid. The apparent viscosity of these fluids changes reversibly by an order of up to 100,000 in response to an electric field. For example, a typical ER fluid can go from the consistency of a liquid to that of a gel or even solid, and back, with response times on the order of milliseconds.

According to present information on Wikipedia The Free Encyclopedia, the change in apparent viscosity is dependent on the applied electric field, i.e. the potential divided by the distance between the plates. The change is not a simple change in viscosity, hence these fluids are now known as ER fluids, rather than by the older term Electro Viscous fluids. The effect is better described as an electric field dependent shear yield stress. When activated an ER fluid behaves as a Bingham plastic (a type of viscoelastic material), with a yield point which is determined by the electric field strength. After the yield point is reached, the fluid shears as a fluid, i.e. the incremental shear stress is proportional to the rate of shear (in a Newtonian fluid there is no yield point and stress is directly proportional to shear). Hence the resistance to motion of the fluid can be controlled by adjusting the applied electric field.

In particular embodiments, the electro-rheological fluid is a stable electro-rheological suspension consisting of barium titanyl oxalate and other nanoparticles in silicone oil. In particular embodiments, the nanoparticles have an average diameter of 50-70 nm. In other embodiments the nanoparticles have a surface coating of from 3 to 10 nm.

In embodiments employing barium titanyl oxalate nanoparticles, the nanoparticles may be fabricated by first dissolving barium chloride in distilled water at controlled temperatures. Separately, oxalic acid is dissolved in water in an ultrasonic tank, and titanium tetrachloride is slowly added. This forms titanyl oxalate particles with an average diameter of 50-70 nm and a surface coating of about 3 to 10 nm. These nanoparticles are mixed with silicone oil and other liquid components to provide an electrorheological fluid that is suitable for impregnating the fibers, fabric, tow, performs and prepregs to create the electrorheological composite, and, alternatively, is suitable for filling microspheres.

It will be appreciated that different ER fluids will be suitable for different applications, and the present invention does not seek to reinvent or provide any specifics on ER fluids. Many ER fluids exist and it is expected that many will be developed in the future. The present invention focuses upon means for incorporating ER fluids into polymeric articles such that the article can be made to change its viscoelastic modulus by application of electric field. Different ER fluids will have different minimum field strengths necessary to alter the viscoelastic modulus. In a particularly beneficial application, the polymeric article is a tire, and the ER fluid is provided therein either as ER fluid filling a pocket or as an electrically-responsive component (fabric, fiber, perform, prepreg, microsphere) so that the rolling resistance of the tire can be altered by the application of an electric field across the tire body. This is generally represented in FIG. 8, wherein a smart tire 610 includes a tire 612 having an ER fluid 624 therein (the suspended particles are represented) whether at a pocket built into the tire 612 or as part of an electrically-responsive component built into the tire 612. An electric field can be generated across the ER fluid 624 by terminals 616, a switch 620 and an adjustable voltage source 618 measured by a voltmeter V. Upon the application of an electric field of suitable strength, the ER fluid responds through particle alignment along the direction of electric filed lines E and the elastic modulus of the tire is affected, creating a stiffer tire.

In some embodiments, the field strength applied will be from 50 to 2000 V/mm. In embodiments employing barium titanyl oxalate, the electrically-responsive component (fabric/fibers/microspheres etc) will stiffen when the field strength is in the order of 100-500 V/mm.

Different chemical coatings can be applied to enhance the electro-rheological effects of these smart fabrics and thus delay and increase the speed of change in viscosity such that the ER fluid can either form the core of a hollow fiber structure or be intercalated between fiber laminates.

From the foregoing, it is appreciated that the present invention provides electrorheological fluid composites or spheres in a polymer matrix such that the elastic modulus of the polymer article made thereby can be altered by an applied electric field strength from 50-2000 V/mm. In other embodiments, the present invention provides ER fluid-filled microspheres in a polymer matrix so that the elastic modulus of the polymeric article formed thereof can be altered by an applied voltage.

In other embodiments, the polymeric articles include electroactive components with ER fluids, or combination thereof. With electroactive components, the application of stress creates an electric polarization/field that affects the ER fluid, causing an increase in modulus without the application of external electric polarization/field. For example, a polymeric article including an electrorheological composite made of an electroactive polymer, and particularly a piezoelectric polymer, with ER fluid therein and/or thereon would react to an applied stress by the electroactive polymer generating a voltage such that the ER fluid increases in viscosity and the article increases in elastic modulus. Referring now to FIG. 9, this ability to respond to an applied stress is schematically represented by an electrically-responsive component in the form of a hollow fiber or tube having ER fluid therein, the tube being formed of a piezoelectric material (e.g polymer or ceramic). Upon the application of stress (e.g. bending, compression), the piezoelectric material develops an electric field that can affect the ER fluid to increase its viscoelastic modulus. The arrows represent the applied pressure. The particles suspended within the ER fluid become ordered and aligned across the poles generated by the piezoelectric material, this alignment and ordering causing the increase in viscoelastic modulus. Some ER fluids will even transform from liquid to solid phase. Regardless whether phase transformation occurs, this apparent viscosity increase provides additional contact stress and stiffness to the overall tubular structure. If used in tires, the tire could respond to the impact realized by bumps, potholes and the like by increasing/decreasing in time-dependent stiffness/elastic modulus. It should be appreciated that the same phenomenon will be experienced when the ER fluid is not inside of a piezoelectric tube, but is merely intercalated therewith, as in the descriptions above regarding fabrics, fibers, preforms and prepregs.

It will be appreciated that microspheres are currently incorporated into polymeric articles, such that the polymeric articles of the present invention containing ER fluid-filled microspheres can be made in conventional ways. This is similarly true for the incorporation of the fibers, fabrics, tows, performs and prepregs embodiments. The non-woven or woven fabrics and discrete fibers carrying ER fluid can be used in polymeric article manufacturing processes as would any typical woven or non-woven fabric or discrete fiber.

Figure 5:
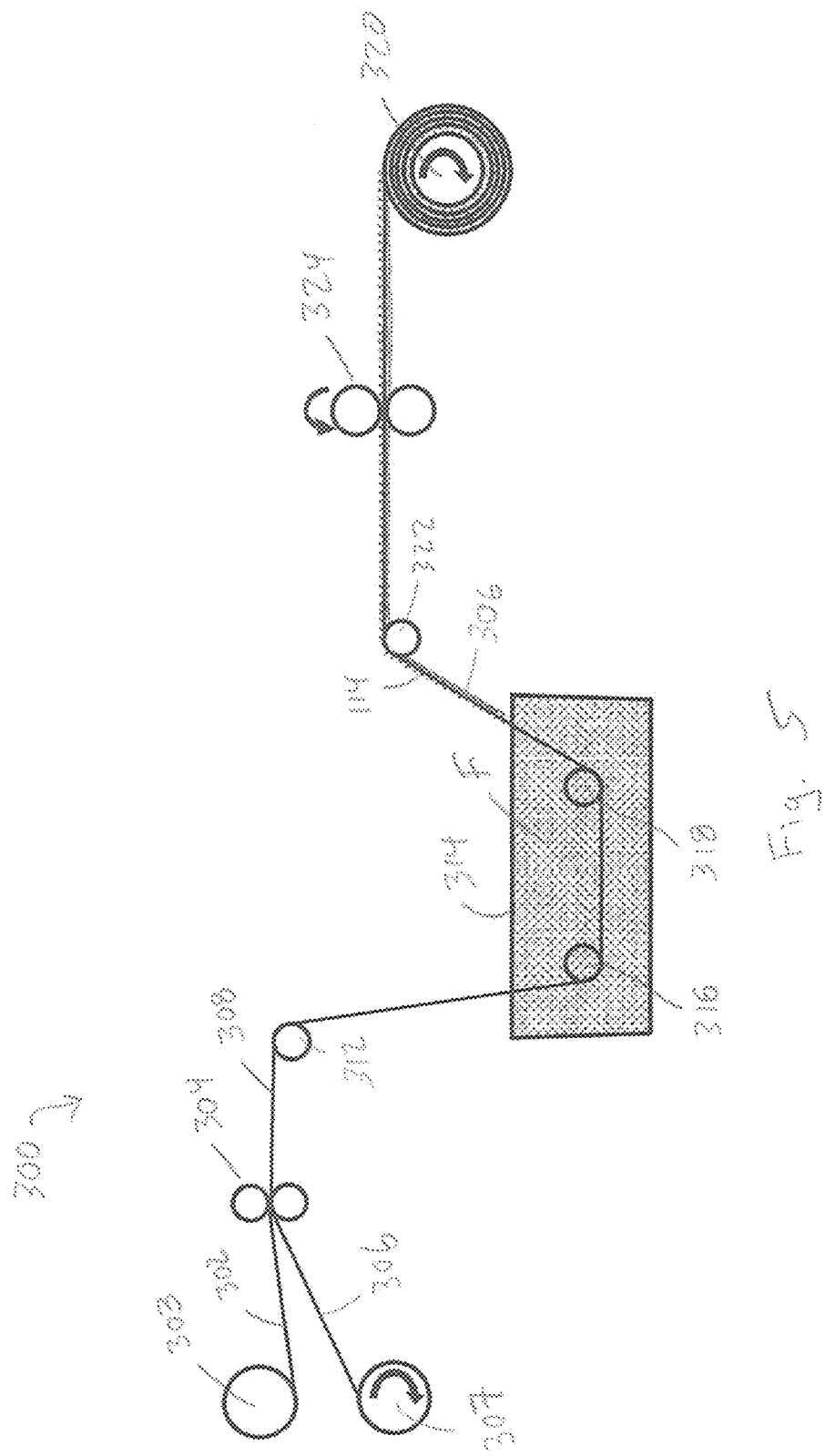
FIG. 5 is a general schematic of an exemplary method of creating a polymeric article in accordance with this invention, employing a fabric to receive electrorheological fluid.
Figure 4:
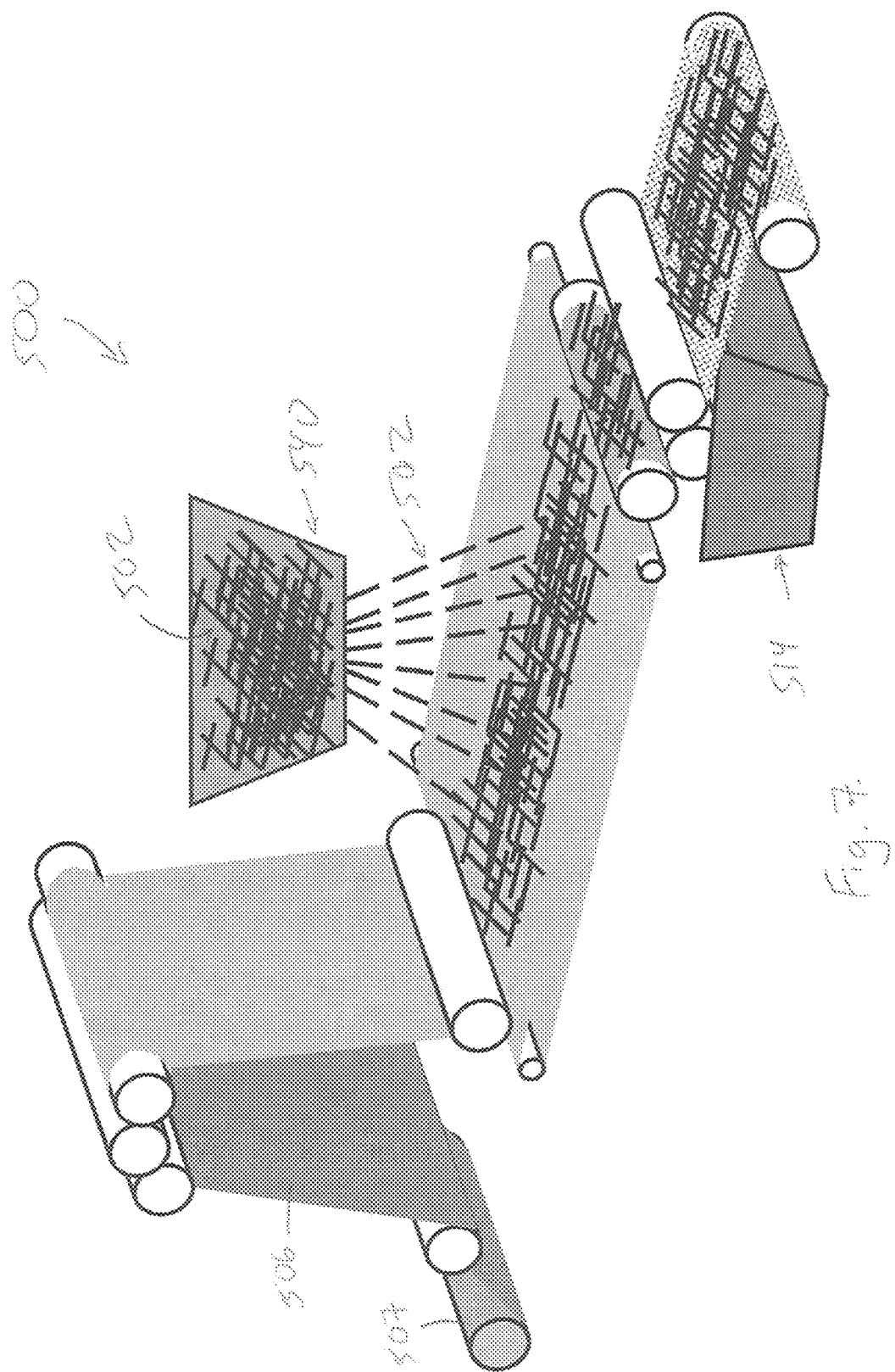
Figure 5:
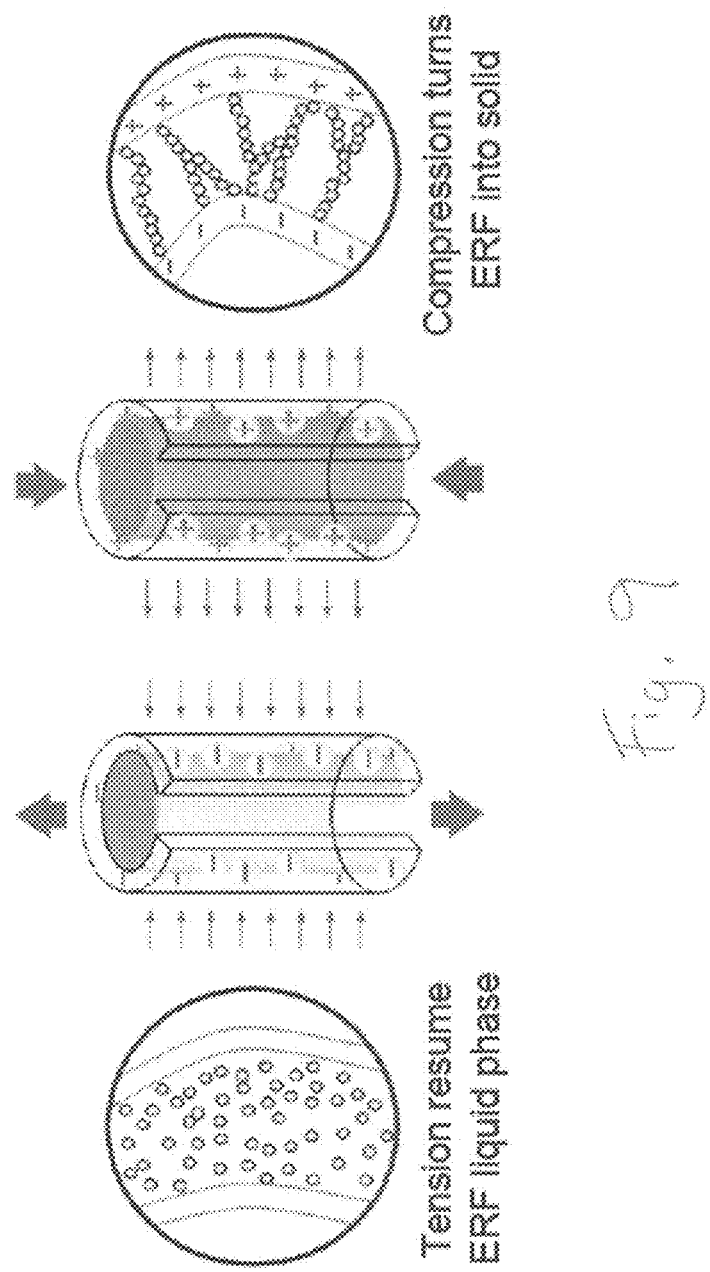

By way of non-limiting example, a first method of incorporating a woven or non-woven fabric electrorheological composite into a ply of polymer is shown in FIG. 5 and designated by the numeral 300. A woven or non-woven fabric 302 is fed from a roll 303 to pinch rolls 304 along with the polymer carrier mat 306 fed from roll 307. The pinch rolls 304 press the two components together to form a composite material 308. This composite material is fed over a roll 312 to an electrorheological fluid bath 314. Rollers 316 and 318 are positioned within the volume of ER fluid F, and the composite must travel through the fluid F around the rollers 316, 318. This creates an electrorheological composite of the woven or non-woven fabric type, as, for example, at composite 114 of FIG. 2, already carried on a carrier mat 306, which might be a polymer ply. This electrorheological composite 114 and carrier mat 306 is collected at a take-up roll 320 after being guided from the electrorheological fluid bath 314 by a roller 322. Optionally, the electrorheological composite might be further pinched at pinch rolls 324. The ply collected at take-up roll 320 can then be used to form articles, such as tires.

Another method of incorporating ER fluid onto a fiber is shown in FIG. 6 and designated by the numeral 400.

Multiple fibers 402 (or tows) are advanced from tensioners through an electrorheological fluid bath 414 holding an ER fluid F. As the ER fluid-coated fibers 415 exit the bath 414, they advance through a guide aperture 430 in a moving platform 432. The moving platform 432 moves laterally relative to a rotating mandrel 426 so as to efficiently wind the grouping of ER fluid-coated fibers (or tows) on the mandrel. These fibers or tows can then be used to create woven or non-woven fabrics or discrete fibers for use as described herein.

Referring now to FIG. 7, yet another method is provided and designated by the numeral 500. In this method, a carrier mat 506 is advanced from a carrier mat roller 507 underneath a sprayer 540 for spraying discrete fibers 502 onto the exposed surface of the carrier mat. The carrier mat, now carrying discrete fibers, is passed through an electrorheological fluid bath 514 holding ER fluid. This coats the discrete fibers with ER fluid, and the assembled carrier mat and discrete fibers can be employed to create polymeric articles in accordance with this invention, including tires.

Although the processes of FIGS. 5-7 show continuous application of fabrics or discrete fibers, it will be appreciated that the fabric or discrete fibers may be laid down in discrete sections along the carrier mat. It will be appreciated that these methods are merely examples, and other methods for incorporating fibers, fabrics, tows, performs, prepregs or microspheres with ER fluids into polymeric articles will be apparent to those of ordinary skill in the art as in filament winding, pultusion, resin/ER fluid transfer molding, compounding, compression molding, overlaying on tire components, etc.

In a particular embodiment, the composites or spheres herein are incorporated into the body ply of a tire. As such, the ER fluid may be incorporated into common fabrics or microspheres employed to manufacture tires, and the electrorheological composite or filled microsphere formed by adding the ER fluid to the fabric or the microsphere can be employed in the same manner that the fabric or microsphere is commonly incorporated into the tire. That is, by incorporating the ER fluid into a common tire fabric or microsphere, the typical manufacturing process of the tire can be followed, but with ER fluid beneficially present in the body ply. The fabrics may be laid in the direction of tire rotation or transverse thereto or at any angle with respect to the direction of rotation of the tire. The ER fluid composite may be continuous along the circumference of the tire or can be laid down at discrete locations.

What is claimed is:

1. A method of altering the elastic modulus of a polymeric article comprising:
    electrospinning a hollow non-woven fabric containing electrorheological fluid therein,
    incorporating the electrospun, electrorheological-fluid-containing non-woven fabric into a polymer matrix to thereby form a polymeric article, and
    subjecting the electrorheological fluid to an electric field thereby changing the elastic modulus of the electrorheological fluid and the overall elastic modulus of the polymeric article.

2. The method of claim 1, the polymeric article comprising:
    a polymer matrix made from a first polymer layer and a second polymer layer, a mid-layer positioned between the first polymer layer and the second polymer layer, the mid-layer comprising an electrorheological composite made from a support and an electrorheological fluid, said support made from discrete fibers.

3. The method of claim 1, wherein the electrorheological fluid comprises barium titanyl oxalate particles suspended in silicone oil.

4. The method of claim 1, further comprising a voltage source selectively applying the electric field to the electrorheological fluid.

5. The method of claim 1, wherein the electrorheological fluid is a suspension of non-conducting particles in an electrically insulating fluid, wherein the non-conducting particles have a diameter of less than 50 micrometers.

6. The method of claim 1, wherein said step of incorporating includes manufacturing a body ply of a tire.

* * * * *